US009035800B2

(12) United States Patent
Bommer et al.

(10) Patent No.: US 9,035,800 B2
(45) Date of Patent: May 19, 2015

(54) FUEL TANK MONITORING SYSTEM

(71) Applicant: The Boeing Company, Chicago, IL (US)

(72) Inventors: Jason Philip Bommer, Tacoma, WA (US); Andrew M. Robb, Ravensdale, WA (US)

(73) Assignee: The Boeing Company, Chicago, IL (US)

( * ) Notice: Subject to any disclaimer, the term of this patent is extended or adjusted under 35 U.S.C. 154(b) by 400 days.

(21) Appl. No.: 13/650,380

(22) Filed: Oct. 12, 2012

(65) Prior Publication Data
US 2014/0104079 A1 Apr. 17, 2014

(51) Int. Cl.
G08B 21/00 (2006.01)
G01F 23/00 (2006.01)
G01F 23/26 (2006.01)

(52) U.S. Cl.
CPC ............ *G01F 23/0076* (2013.01); *G01F 23/26* (2013.01)

(58) Field of Classification Search
USPC .............. 340/545.4, 562, 602, 604, 612, 614, 340/616, 618, 626, 450.2, 936, 572.1, 340/572.7, 945; 73/53.01, 314, 290 R, 292, 73/304 C; 702/52, 50, 55
See application file for complete search history.

(56) References Cited

U.S. PATENT DOCUMENTS

| 3,728,897 | A | * | 4/1973 | Wallman ..................... 73/304 C |
| 4,173,893 | A | * | 11/1979 | Hedrick ....................... 73/304 C |
| 4,841,227 | A | | 6/1989 | Maier |
| 5,051,921 | A | * | 9/1991 | Paglione ......................... 702/52 |
| 5,627,380 | A | * | 5/1997 | Crowne ......................... 250/577 |
| 5,708,424 | A | * | 1/1998 | Orlando et al. .......... 340/870.08 |
| 5,739,416 | A | * | 4/1998 | Hoenk .......................... 73/29.01 |
| 6,101,873 | A | * | 8/2000 | Kawakatsu et al. ......... 73/304 C |
| 6,335,690 | B1 | * | 1/2002 | Konchin et al. .............. 340/618 |
| 6,720,866 | B1 | * | 4/2004 | Sorrells et al. .............. 340/10.4 |
| 8,022,793 | B2 | | 9/2011 | Olson et al. |
| 8,026,857 | B2 | | 9/2011 | Bommer |
| 8,040,243 | B2 | * | 10/2011 | Bommer et al. ........... 340/572.7 |
| 8,111,143 | B2 | * | 2/2012 | Tong et al. ................. 340/10.51 |
| 8,134,469 | B2 | * | 3/2012 | Bucciero ...................... 340/612 |

(Continued)

FOREIGN PATENT DOCUMENTS

| EP | 0690293 A2 | 1/1996 |
| EP | 2642259 A1 | 9/2013 |

OTHER PUBLICATIONS

Extended European Search Report, dated Jan. 16, 2014, regarding Application No. EP13188531.1, 6 pages.

(Continued)

*Primary Examiner* — Brian Zimmerman
*Assistant Examiner* — An T Nguyen
(74) *Attorney, Agent, or Firm* — Yee & Associates, P.C.

(57) ABSTRACT

A method and apparatus for monitoring an interior of a fuel tank. Information about a fuel level and moisture in the interior of the fuel tank of a platform is generated using a fuel sensor unit in the interior of the fuel tank. The fuel sensor unit comprises a sensor configured to be located in the interior of the fuel tank and generate information about the fuel level in the fuel tank and the moisture in the fuel tank and a wireless unit electrically connected to the sensor. The wireless unit is configured to receive the information from the sensor and transmit the information using wireless signals. A number of actions is identified based on the information about the interior of the fuel tank.

17 Claims, 9 Drawing Sheets

(56) References Cited

U.S. PATENT DOCUMENTS

| | | |
|---|---|---|
| 8,237,548 B2 | 8/2012 | Fay et al. |
| 8,384,521 B2 | 2/2013 | Matsen et al. |
| 8,416,090 B2 | 4/2013 | Bucciero |
| 8,538,591 B1 * | 9/2013 | Klughart ............... 700/281 |
| 8,615,374 B1 * | 12/2013 | Discenzo ............... 702/127 |
| 2003/0000303 A1 * | 1/2003 | Livingston et al. ....... 73/304 C |
| 2004/0036487 A1 * | 2/2004 | Heremans et al. ........ 324/698 |
| 2005/0022581 A1 * | 2/2005 | Sunshine ............... 73/31.05 |
| 2010/0177801 A1 * | 7/2010 | Geren et al. ............ 374/117 |
| 2010/0318243 A1 | 12/2010 | Lewis et al. |
| 2011/0018686 A1 | 1/2011 | Fahley et al. |
| 2011/0130882 A1 * | 6/2011 | Perez ................... 700/282 |
| 2011/0246100 A1 * | 10/2011 | Carvalho et al. .......... 702/50 |
| 2012/0065904 A1 * | 3/2012 | Tichborne et al. ......... 702/55 |
| 2012/0105086 A1 | 5/2012 | Bommer et al. |
| 2012/0158321 A1 | 6/2012 | Bommer et al. |
| 2012/0167676 A1 | 7/2012 | Bucciero |
| 2013/0269421 A1 * | 10/2013 | Tichborne et al. ......... 73/53.01 |
| 2014/0008989 A1 | 1/2014 | Bommer et al. |
| 2014/0104079 A1 * | 4/2014 | Bommer et al. ........... 340/945 |

OTHER PUBLICATIONS

Bommer et al., "Wireless Fuel Sensor System," U.S. Appl. No. 13/942,981, filed Jul. 16, 2013, 78 pages.

Robb et al., "Highly Resistive Wiring for Inherent Safety from Electromagnetic Threats," U.S. Appl. No. 12/924,287, filed Sep. 23, 2010, 15 pages.

Bommer et al., "Wireless Power Harvesting Along Multiple Paths in a Reverberent Cavity" U.S. Appl. No. 13/533,934, filed Jun. 26, 2012, 23 pages.

* cited by examiner

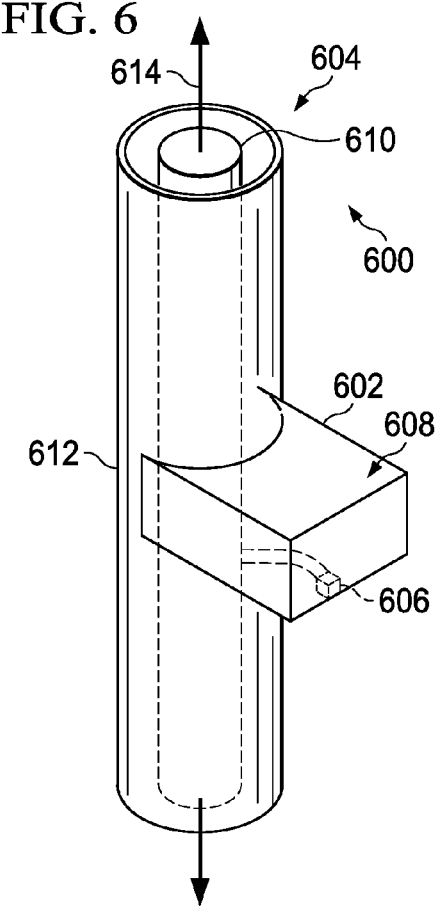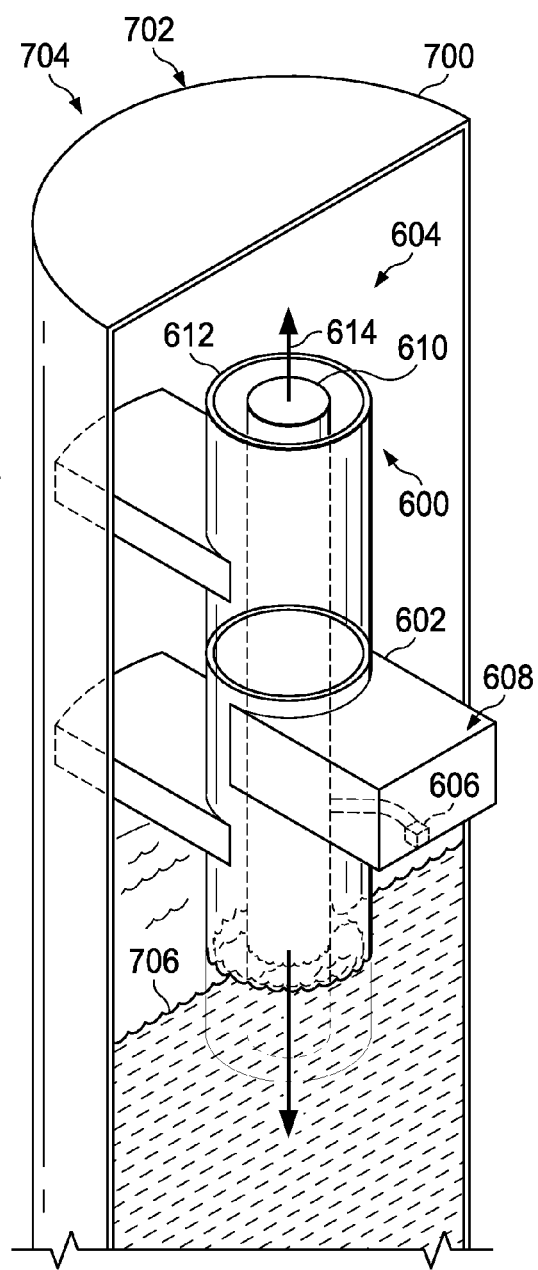

FUEL TANK MONITORING SYSTEM

BACKGROUND INFORMATION

1. Field

The present disclosure relates generally to fuel tanks and, in particular, to monitoring fuel tanks. Still more particularly, the present disclosure relates to a method and apparatus for measuring multiple parameters in a fuel tank.

2. Background

Identifying the amount of fuel present in a fuel tank is useful in operating aircraft. Information about the fuel level in the fuel tank may be displayed on a display in the cockpit of the aircraft. The information may be used by a pilot to determine how far the aircraft can fly. Additionally, this information may be used by computer systems in the aircraft to determine the range that the aircraft can fly with the present fuel level in the fuel tank.

A sensor is present in the fuel tank that provides information about the level of the fuel. This sensor may take various forms. For example, the sensor may be a float connected to a potentiometer, a capacitive probe, or some other suitable type of sensor.

With a capacitive probe, an outer tube may house an inner tube. Fuel fills an opening in the space between the outer and inner tubes. As the fuel level changes, the capacitance changes depending on the height of fuel in the tubes. This capacitance information indicates the amount of fuel present in the fuel tank.

The fuel level may be the height of the fuel in the fuel tank. The amount of fuel may be the number of gallons of fuel. This amount may be calculated from the fuel level detected in the fuel tank. The information about the fuel level is sent to a device outside of the fuel tank for display in the cockpit.

The device may be a controller that receives a signal from the capacitive probe through a wired connection. The controller may then provide output to the fuel gauge based on the signal received from the capacitive probe.

Further, it may be desirable to sense other parameters within the fuel tank other than fuel level. For example, one sensor system may be used to detect fuel level while another sensor system may be used to detect temperature.

With the use of different types of sensor systems, the complexity of components and wires used by the sensor systems may increase more than desired. As a result, the addition of these components may add more weight to the aircraft than desired. Moreover, the time needed to install or rework complex fuel tank sensor systems may be greater than desired.

Therefore, it would be desirable to have a method and apparatus that takes into account at least some of the issues discussed above, as well as other possible issues.

SUMMARY

In one illustrative embodiment, an apparatus comprises a sensor and a wireless unit electrically connected to the sensor. The sensor is configured to be located in an interior of a fuel tank. The sensor is further configured to generate information about a fuel level in the fuel tank and about moisture in the fuel tank. The wireless unit is configured to receive the information from the sensor and transmit the information using wireless signals.

In another illustrative embodiment, a fuel tank monitoring system comprises a number of fuel sensor units, a wireless unit, and computer system. The number of fuel sensor units is configured to be located in an interior of a fuel tank. Each fuel sensor unit in the number of fuel sensor units comprises a sensor configured to generate information about a fuel level in the fuel tank and moisture in the fuel tank. The wireless unit is electrically connected to the sensor. The wireless unit is configured to receive the information from the sensor and transmit the information using wireless signals. The computer system is configured to receive the information from the number of fuel sensor units and display the information on a graphical user interface.

In yet another illustrative embodiment, a method for monitoring an interior of a fuel tank is present. Information about a fuel level and moisture in the interior of the fuel tank of a platform is generated using a fuel sensor unit in the interior of the fuel tank. The fuel sensor unit comprises a sensor configured to be located in the interior of the fuel tank and generate information about the fuel level in the fuel tank and the moisture in the fuel tank and a wireless unit electrically connected to the sensor. The wireless unit is configured to receive the information from the sensor and transmit the information using wireless signals. A number of actions is identified based on the information about the interior of the fuel tank.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 6 is an illustration of a sensor unit in accordance with an illustrative embodiment;

FIG. 7 is an illustration of a sensor unit in a fuel tank in accordance with an illustrative embodiment;

DETAILED DESCRIPTION

The illustrative embodiments recognize and take into account one or more different considerations. For example, the illustrative embodiments recognize and take into account that one manner in which the complexity of sensor systems may be reduced is by reducing the amount of wires used in the sensor system. With a wireless connection, wires extending into the fuel tank to sensors and holes for the wires may be reduced or avoided.

The illustrative embodiments recognize and take into account that a wireless unit may be electrically connected to a sensor within the fuel tank. This wireless unit may receive information from the sensor and transmit that information using wireless signals to an antenna system in the fuel tank. The antenna system sends the information to a device located outside of the fuel tank. The device may then display the information to an operator of the aircraft. The wireless unit may be, for example, a radio frequency identification device. In these illustrative examples, the sensor may be implemented using a capacitive probe.

The illustrative embodiments also recognize and take into account that detecting the fuel level in a fuel tank may not provide as much information as desired for operating the aircraft. For example, the illustrative embodiments recognize and take into account that other information, such as information about moisture in the fuel tank, may be useful in operating an aircraft in addition to detecting the fuel level in the fuel tank. The presence of moisture in the fuel tank may indicate that maintenance may need to be performed on the fuel tank to remove the moisture, the source of moisture, or both.

Thus, the illustrative embodiments provide a method and apparatus for generating information about fuel in a fuel tank. In one illustrative embodiment, an apparatus comprises a sensor and a wireless unit. The sensor is configured to be located in an interior of the fuel tank and generate information about the fuel level in the interior of the fuel tank and about moisture in the fuel tank. The wireless unit is electrically connected to the sensor. The wireless unit is configured to receive the information from the sensor and transmit the information using wireless signals.

Figure 1:
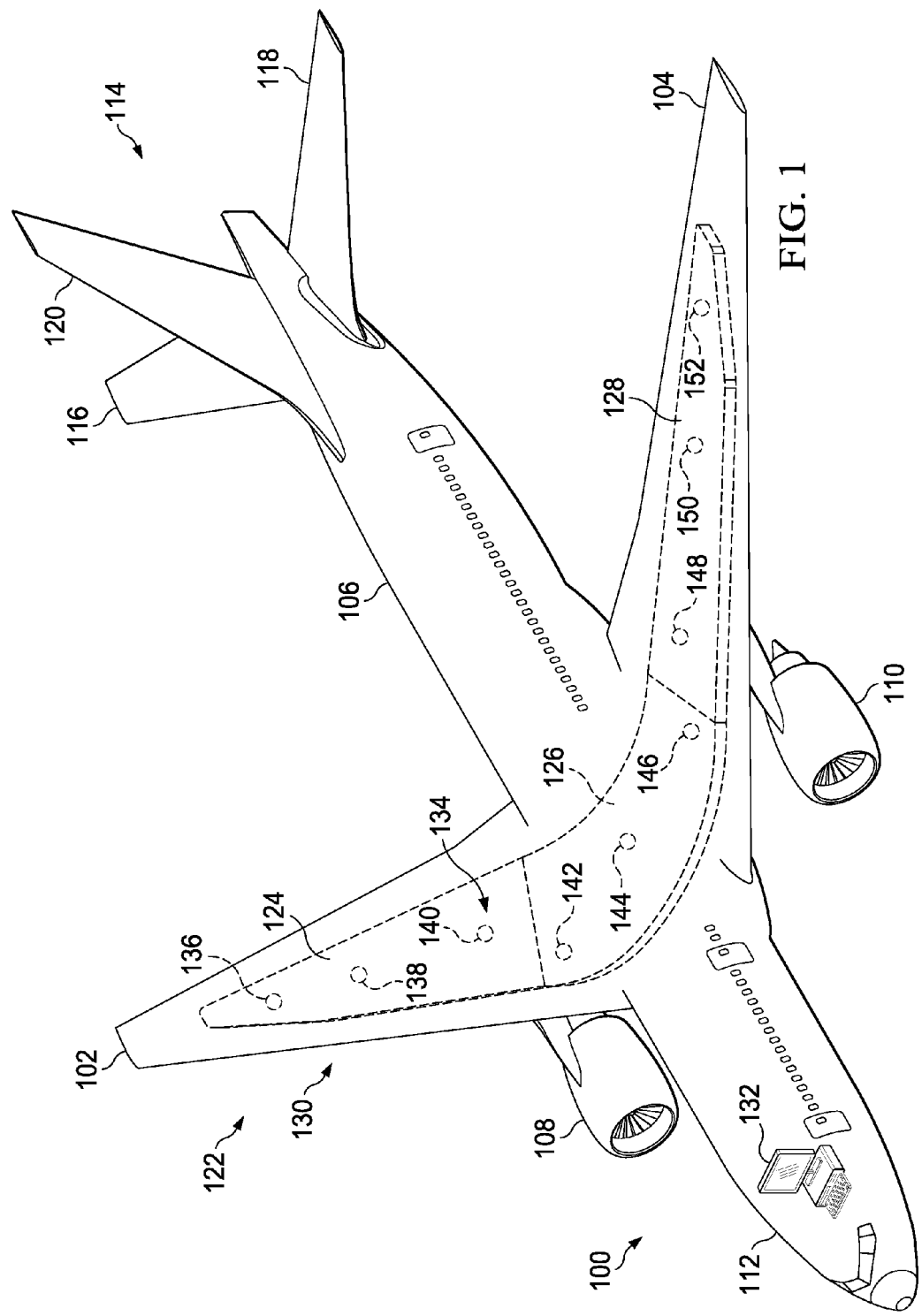
FIG. 1 is an illustration of an aircraft in accordance with an illustrative embodiment.

With reference now to the figures and, in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has nose section 112 and tail section 114. Horizontal stabilizer 116, horizontal stabilizer 118, and vertical stabilizer 120 are attached to tail section 114 of body 106.

In these illustrative examples, aircraft 100 includes fuel tank system 122. In this illustrative example, fuel tank system 122 is located in wing 102, wing 104, and body 106 of aircraft 100. As can be seen in this illustrative example, fuel system 122 includes main fuel tank 124 in wing 102, center fuel tank 126 in body 106, and main fuel tank 128 in wing 104.

In these illustrative examples, a fuel tank monitoring system may be implemented in aircraft 100 to generate information about fuel tank system 122. In these illustrative examples, when implemented in accordance with an illustrative embodiment, fuel tank system 122 may have a reduced weight as compared to a wired fuel tank monitoring system. Further, the inspection and maintenance of fuel tank system 122 also may be reduced when using fuel tank monitoring system 130 in aircraft 100 in accordance with an illustrative embodiment.

In this illustrative example, fuel tank monitoring system 130 includes computer system 132 and fuel sensor units 134. Fuel sensor units 134 comprise fuel sensor unit 136, fuel sensor unit 138, fuel sensor unit 140, fuel sensor unit 142, fuel sensor unit 144, fuel sensor unit 146, fuel sensor unit 148, fuel sensor unit 150, and fuel sensor unit 152. As depicted, fuel sensor unit 136, fuel sensor unit 138, and fuel sensor unit 140 are located in main fuel tank 124. Fuel sensor unit 142, fuel sensor unit 144, and fuel sensor unit 146 are located in center fuel tank 126. Fuel sensor unit 148, fuel sensor unit 150, and fuel sensor unit 152 are located in main fuel tank 128 in this illustrative example.

As depicted, fuel sensor units 134 transmit information about main fuel tank 124, center fuel tank 126, and main fuel tank 128 in fuel tank system 122 to computer system 132 using wireless signals. Wires are not needed to connect computer system 132 to fuel sensor units 134. As a result, the weight, complexity, or both weight and complexity of fuel tank monitoring system 130 in aircraft 100 may be reduced.

Figure 2:
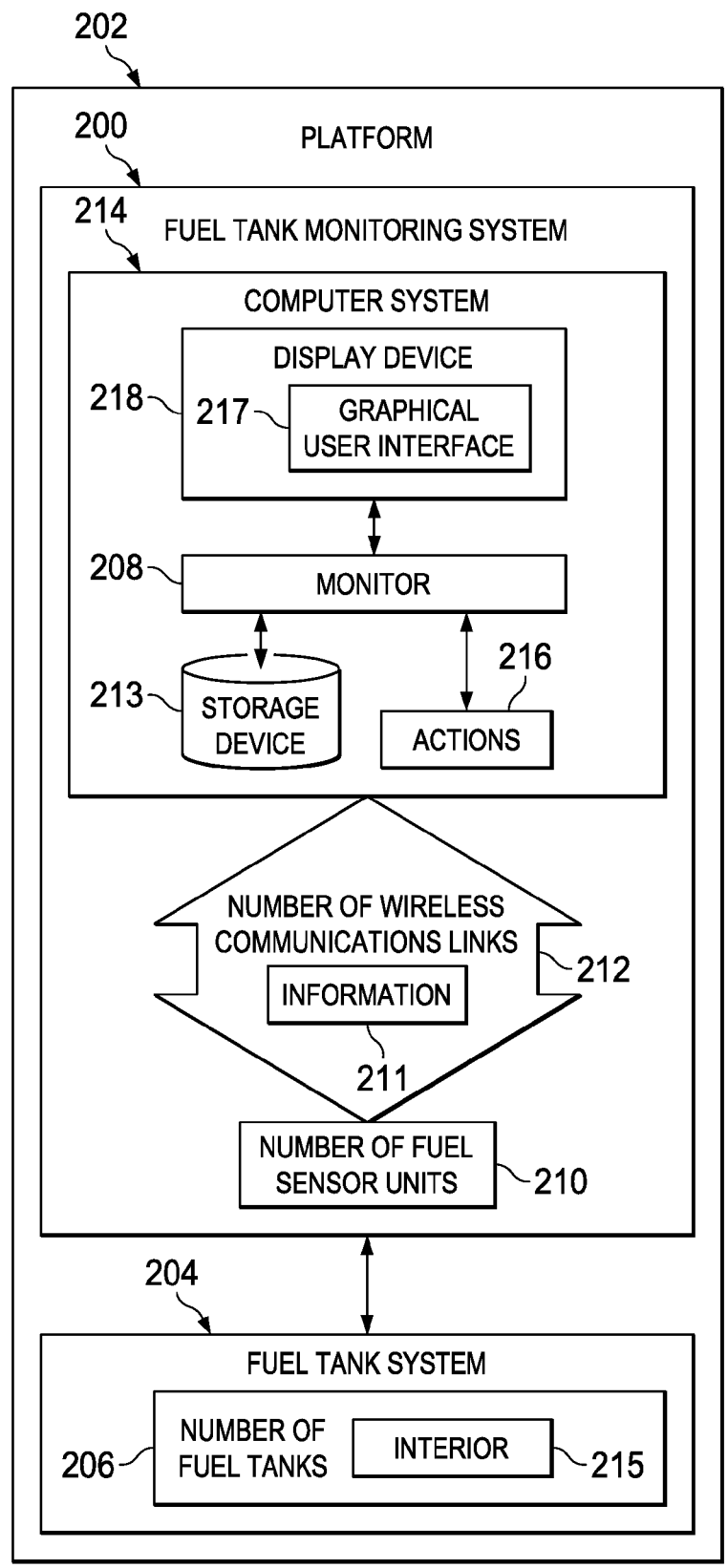
FIG. 2 is an illustration of a block diagram of a fuel tank monitoring system in accordance with an illustrative embodiment.

Turning now to FIG. 2, an illustration of a block diagram of a fuel tank monitoring system is depicted in accordance with an illustrative embodiment. In this illustrative example, fuel tank monitoring system 200 may be associated with platform 202.

When one component is "associated" with another component, the association is a physical association in these depicted examples. For example, a first component, fuel tank monitoring system 200, may be considered to be associated with a second component, platform 202, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

Aircraft 100 in FIG. 1 is an example of one implementation for platform 202 in FIG. 2. Fuel tank monitoring system 130 in FIG. 1 is an example of one implementation for fuel tank monitoring system 200 in FIG. 2.

In this illustrative example, fuel tank monitoring system 200 is configured to monitor fuel tank system 204 in platform 202. As depicted, fuel tank system 204 is comprised of number of fuel tanks 206. As used herein, a "number of" when used with reference to items means one or more items. For example, number of fuel tanks 206 is one or more fuel sensor units.

In this illustrative example, fuel tank monitoring system 200 comprises a number of different components. As depicted, fuel tank monitoring system 200 includes monitor 208 and number of fuel sensor units 210.

Monitor 208 is configured to receive information 211 from number of fuel sensor units 210. In these illustrative examples, monitor 208 is configured to receive information 211 from number of fuel sensor units 210 over number of wireless communications links 212.

In one illustrative example, monitor 208 may be configured to sample information 211. In other words, monitor 208 may request information 211 from number of fuel sensor units 210 periodically, in response to an event, or both. In other illustrative examples, monitor 208 may continuously receive information 211.

In these illustrative examples, information 211 may be stored in storage device 213. Storage device 213 may be a hard drive, a flash drive, a memory, or some other suitable type of storage device in computer system 214. In this manner, information 211 stored in storage device 213 may later be retrieved for analysis or other use.

As depicted, monitor 208 may be implemented in software, hardware, or a combination of the two. When software is used, the operations performed by monitor 208 may be implemented in program code configured to run on a processor unit. When hardware is employed, the hardware may include circuits that operate to perform the operations in monitor 208.

In these illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

In this illustrative example, monitor 208 may be implemented within computer system 214. Computer system 214 may be one or more computers. When more than one computer is present in computer system 214, those computers may be in communication with each other over a communications medium such as a network.

In this illustrative example, number of fuel sensor units 210 is configured to be located within fuel tank system 204. In particular, number of fuel sensor units 210 is configured to be located within interior 215 of number of fuel tanks 206 in fuel tank system 204. In this illustrative example, number of fuel sensor units 210 is configured to generate information 211 about number of fuel tanks 206 in fuel tank system 204.

Further, monitor 208 is configured to use information 211 to identify actions 216 that may be performed. Actions 216 may include at least one of displaying information 211, storing information 211, generating an alert, initiating a maintenance request, calculating a range of travel for platform 202, and other suitable actions.

In these illustrative examples, when information 211 is displayed, information 211 may be displayed on graphical user interface 217 on display device 218 in computer system 214. The display of information 211 on graphical user interface 217 may be used by operators of platform 202 to perform actions 216.

With information 211 received from number of fuel sensor units 210 located in number of fuel tanks 206, information about the state of number of fuel tanks 206 may be identified. For example, the fuel level in different fuel tanks in number of fuel tanks 206 may be displayed on graphical user interface 217 to operators of platform 202. In this manner, an operator may monitor the fuel usage from different fuel tanks in number of fuel tanks 206.

Further, the operator may perform operations based on information 211. For example, the operator may transfer fuel from one of number of fuel tanks 206 to another one of number of fuel tanks 206. In other illustrative examples, the operator may perform other operations in response to receiving information 211.

Additionally, monitor 208 may use information 211 about the fuel level in number of fuel tanks 206 to calculate the total amount of fuel present in number of fuel tanks 206 in fuel tank system 204. This amount of fuel may be displayed in graphical user interface 217.

In these illustrative examples, fuel tank monitoring system 200 may be added to platform 202 after platform 202 has been manufactured. In other illustrative examples, fuel tank monitoring system 200 may be integrated as part of platform 202 during manufacturing of platform 202.

Figure 3:
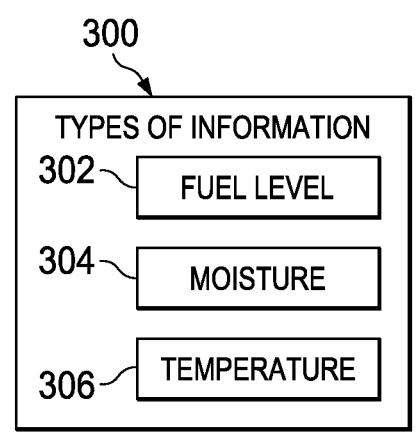
FIG. 3 is an illustration of a block diagram of types of information that may be generated by a number of sensor units in accordance with an illustrative embodiment.

With reference now to FIG. 3, an illustration of a block diagram of types of information that may be generated by a number of sensor units is depicted in accordance with an illustrative embodiment. In this depicted example, types of information 300 are examples of types of information that may be present in information 211 generated by number of fuel sensor units 210 in FIG. 2. In this illustrative example, types of information 300 that may be found in information 211 may include at least one of fuel level 302, moisture 304, temperature 306, and other suitable types of information.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C or item B and item C.

Fuel level 302 may be the fuel level in one or more of number of fuel tanks 206 in FIG. 2. Additionally, fuel level 302 may be the height of fuel in number of fuel tanks 206. With fuel level 302, monitor 208 in FIG. 2 may identify an amount of fuel present in number of fuel tanks 206. This amount of fuel may be measured in gallons, liters, or some other suitable type of unit. This information may be used to plan or select actions 216 with respect to the operation of platform 202 in FIG. 2.

Moisture 304 may indicate whether moisture is present in number of fuel tanks 206. If moisture 304 is present, this information may be used to generate an action in actions 216 such as an alert to perform maintenance on number of fuel tanks 206. This maintenance may include flushing one or more of number of fuel tanks 206.

Additionally, information 211 may indicate moisture 304 is present in a particular fuel tank in number of fuel tanks 206, indicate moisture 304 is present in some number of fuel tanks in fuel tanks 206, or as an aggregate amount of moisture 304 in fuel tank system 204. In other words, information 211 may be generated based on the amount of moisture 304 measured by each fuel sensor unit individually in number of fuel sensor units 210, the amount of moisture 304 present in each fuel tank in number of fuel tanks 206, based on information generated from multiple fuel sensor units in number of fuel sensor units 210 in the fuel tank, or based on the amount of moisture 304 present in fuel tank system 204 as a whole from information 211 generated by all of number of fuel sensor units 210. If any one of these values exceeds a desired threshold, an alert may be generated to perform maintenance or other operations on one or more of number of fuel tanks 206.

Temperature 306 may be a temperature within interior 215 of fuel tank system 204 in FIG. 2. If temperature 306 is greater than a desired threshold, an alert may be generated as an action in actions 216.

Figure 4:
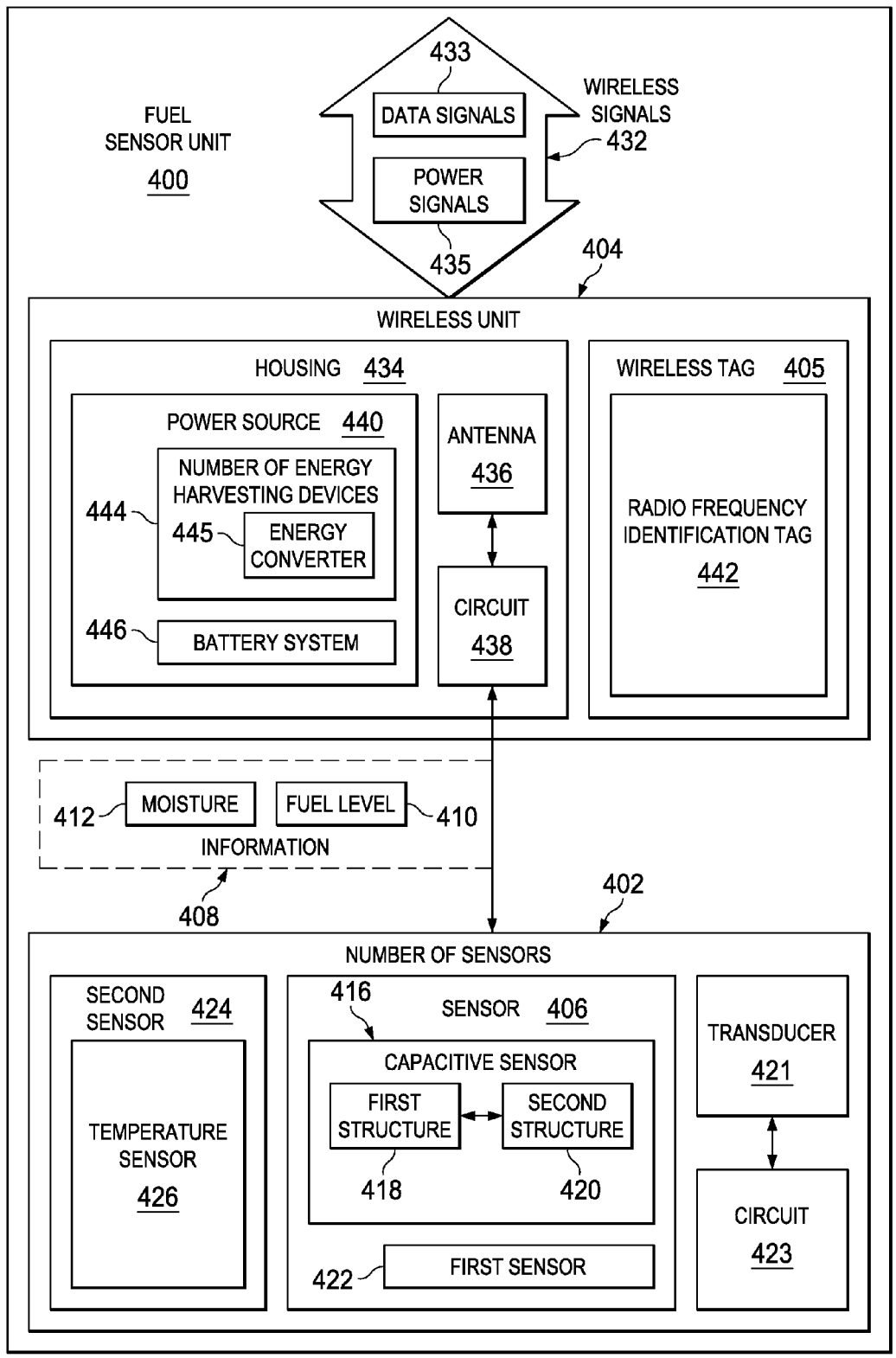
FIG. 4 is an illustration of a block diagram of a fuel sensor unit in accordance with an illustrative embodiment.

With reference now to FIG. 4, an illustration of a block diagram of a fuel sensor unit is depicted in accordance with an illustrative embodiment. In this depicted example, fuel sensor unit 400 is an example of an implementation for one or more fuel sensor units in number of fuel sensor units 210 within fuel tank monitoring system 200 in FIG. 2. Fuel sensor unit 400 may be a radio frequency identification (RFID) tag in some examples.

In this illustrative example, fuel sensor unit 400 is comprised of a number of different components. In this particular example, fuel sensor unit 400 includes number of sensors 402 and wireless unit 404.

As depicted, sensor 406 in number of sensors 402 is configured to be located within interior 215 of a fuel tank in number of fuel tanks 206 in FIG. 2. Sensor 406 is configured to generate information 408 about interior 215 of fuel tank system 204. Additionally, sensor 406 also may be configured to generate information 408 about the fuel tank itself in addition to interior 215 of the fuel tank.

In these illustrative examples, information 408 about interior 215 of the fuel tank may include information about fluids or other materials located within interior 215 of the fuel tank. In this particular example, sensor 406 is configured to generate information 408 in the form of fuel level 410 and moisture 412. For example, information 408 may indicate a presence or absence of moisture 412 in interior 215 of the fuel tank. In this illustrative example, sensor 406 may take the form of capacitive sensor 416.

When sensor 406 takes the form of capacitive sensor 416, sensor 406 may be implemented using any type of sensor in which capacitance changes when fuel level 410 changes in the fuel tank. For example, sensor 406 may comprise first structure 418 and second structure 420 that are positioned relative to each other such that a charge can occur between first structure 418 and second structure 420.

In one illustrative example, first structure 418 may be a first tube and second structure 420 may be a second tube. The first tube may be located inside of the second tube. In particular, the first tube may be concentrically located within the second tube.

In these illustrative examples, the first tube and the second tube may have various types of cross sections. For example, the cross section of the first tube and the second tube may be a circle, an oval, a square, a pentagon, or some other suitable shape.

In another illustrative example, first structure 418 may be a first plate and second structure 420 may be a second plate. The first plate may be positioned substantially parallel to the second plate.

In these illustrative examples, first structure 418 and second structure 420 may be comprised of various types of materials. The material selected for first structure 418 and second structure 420 may be any conductive material that allows for capacitance to occur between first structure 418 and second structure 420 when a current is applied to first structure 418 and second structure 420. The material selected for first structure 418 and second structure 420 may be selected from at least one of carbon fiber, metal, dielectric material loaded with carbon, dielectric material coated with conductive material, or some other suitable type of material.

The difference in capacitance between first structure 418 and second structure 420 may be used to generate information 408 about fuel level 410 and moisture 412 in these illustrative examples. The capacitance changes as the fuel level in contact with first structure 418 and second structure 420 increases or decreases.

Further, electrical conductivity between first structure 418 and second structure 420 may be used to detect the present of moisture 304 in FIG. 3. If moisture 304 is present in one of number of fuel tanks 206, an electrical signal may be received at second structure 420. If an electrical signal is not received at second structure 420, moisture 304 may not be present in number of fuel tanks 206.

Further, sensor 406 in number of sensors 402 may be first sensor 422 and second sensor 424 also may be present. Second sensor 424 may take a number of different forms. For example, second sensor 424 may be selected from one of temperature sensor 426 and other suitable types of sensors. Temperature sensor 426 may generate temperature information in information 408.

In some illustrative examples, one or more of number of sensors 402 may include transducer 421 and circuit 423. Transducer 421 is configured to detect information 408 from number of sensors 402 and send information 408 to circuit 423. Circuit 423 is configured to process information 408 and translate that information into a desired format. Circuit 423 may be for example, at least one of an integrated circuit, a processor unit, a programmable logic array, an application specific integrated circuit (ASIC), and other suitable devices.

In this illustrative example, wireless unit 404 is electrically connected to number of sensors 402. Wireless unit 404 may be wireless tag 405. Wireless unit 404 is configured to receive information 408 from first sensor 422, second sensor 424, or any other sensors in number of sensors 402. In this illustrative example, wireless unit 404 is configured to transmit information 408 using wireless signals 432. Specifically, information 408 is transmitted by data signals 433 in wireless signals 432. In these illustrative examples, wireless signals 432 are radio frequency waves.

As depicted, wireless unit 404 may comprise housing 434, antenna 436, circuit 438, and power source 440. Wireless unit 404 may be radio frequency identification tag 442 in some illustrative examples.

Housing 434 provides a structure in which different components in wireless unit 404 may be located. In these illustrative examples, antenna 436, circuit 438, and power source 440 are associated with housing 434. In particular, these components may be located inside of housing 434.

In these illustrative examples, antenna 436 is configured to send and receive wireless signals 432. Antenna 436 is electrically connected to circuit 438.

Circuit 438 is configured to perform operations with information 408 received from number of sensors 402. These operations may include, for example, without limitation, filtering, preprocessing, storing, transmitting, and other suitable operations.

Circuit 438 may take various forms. For example, circuit 438 may be at least one of an integrated circuit and other suitable types of circuits. Circuit 438 may be, for example, a programmable array logic, an application specific integrated circuit, a field programmable logic array, a field programmable gate array, a processor unit, and other suitable types of hardware devices.

As depicted, circuit 438 is electrically connected to number of sensors 402 and is configured to receive information 408 from number of sensors 402. Further, in some illustrative examples, circuit 438 may be configured to cause number of sensors 402 to collect information.

In these illustrative examples, power source 440 provides power for circuit 438 and number of sensors 402. Power source 440 may be directly or indirectly connected to any of these components to provide power to the components. For example, power source 440 may be directly connected to circuit 438 and indirectly connected to number of sensors 402 through circuit 438.

In these illustrative examples, power source 440 may take a number of different forms. For example, power source 440 may comprise at least one of number of energy harvesting devices 444 and battery system 446.

Number of energy harvesting devices 444 may take various forms. For example, number of energy harvesting devices 444 is configured to derive energy from external sources. Further, number of energy harvesting devices 444 may include at least one of a piezoelectric energy harvesting device, a pyro-electric energy harvesting device, a thermoelectric energy harvesting device, an electrostatic energy harvesting device, a wireless signal energy harvesting device, and other suitable types of harvesting devices.

In one illustrative example, energy converter 445 in number of energy harvesting devices 444 may be configured to generate power using wireless signals 432 that may be received by antenna 436 in wireless unit 404. This energy may cause wireless unit 404 to transmit information 408 in wireless signals 432.

Number of energy harvesting devices 444 in power source 440 may include, for example, energy converter 445. Energy converter 445 may be configured to convert radio frequency power received power signals 435 in wireless signals 432 to electrical power that may be used by circuit 438.

In these illustrative examples, energy converter 445 may take a number of different forms. For example, energy converter 445 may be a rectifying antenna or some other suitable type of energy converter. Energy converter 445 may be configured to convert different types of energy to meet the power requirements for the different types of circuits used in fuel sensor unit 400.

Battery system 446 may include a number of batteries. These batteries may be used to store power generated by number of energy harvesting devices 444 or may provide power to fuel sensor unit 400 when number of energy harvesting devices 444 are absent. When battery system 446 is not present and number of energy harvesting devices 444 is present, wireless unit 404 may be considered a passive wireless unit or a passive radio frequency identification tag.

When wireless unit 404 is passive, wireless unit 404 may only transmit information 408 when wireless signals 432 are received. When wireless unit 404 is active, wireless unit 404 may periodically transmit information 408 over wireless signals 432 without receiving requests over wireless signals 432.

Although number of sensors 402 in fuel sensor unit 400 is shown with transducer 421 and circuit 423, transducer 421 and circuit 423 may not be present, depending on the implementation. For example, data may be processed outside of fuel sensor unit 400 after information 408 is sent to an external device.

The illustration of fuel tank monitoring system 200 and the different components in FIGS. 2-4 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, information 211 may include other types of information in addition to or in place of the information illustrated in FIG. 2, depending on the configuration of number of fuel sensor units 210. Further, different fuel sensor units in number of fuel sensor units 210 may generate different types of information 211.

In other illustrative examples, fuel sensor unit 400 may include one or more additional wireless units in addition to wireless unit 404 that are part of the same unit. Each of these tags may be located in housing 434 and connected to number of sensors 402. The additional wireless units may function as a backup in case wireless unit 404 does not function as desired. In this manner, redundancy may be present for components within fuel sensor unit 400.

As another illustrative example, although platform 202 has been illustrated as taking the form or aircraft 100, platform 202 may take other forms. The platform may be, for example, a mobile platform, a stationary platform, a land-based structure, an aquatic-based structure, and a space-based structure. More specifically, the platform may be a surface ship, a tank, a personnel carrier, a train, a spacecraft, a space station, a satellite, a submarine, an automobile, a power plant, a bridge, a dam, a house, a manufacturing facility, a building, and other suitable platforms.

Figure 5:
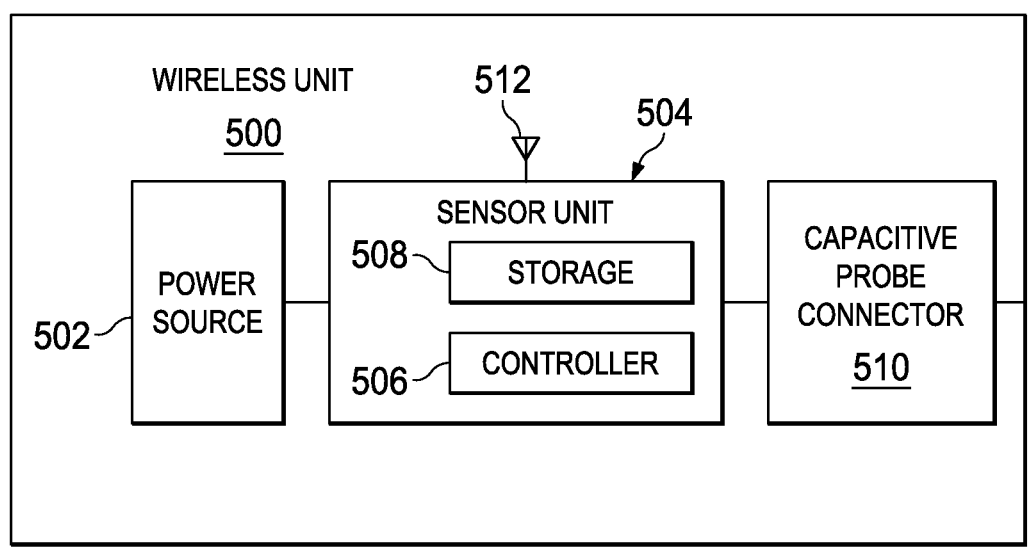
FIG. 5 is an illustration of a wireless unit in accordance with an illustrative embodiment.

Turning now to FIG. 5, an illustration of a wireless unit is depicted in accordance with an illustrative embodiment. In this illustrative example, wireless unit 500 is an example of an implementation for wireless unit 404 in FIG. 4. As depicted, wireless unit 500 includes power source 502, sensor unit 504, controller 506, storage 508, capacitive probe connector 510, and antenna 512.

Sensor unit 504 may include controller 506. Controller 506 may in include a microcontroller and circuits. Controller 506 may include firmware. The circuits may be configured to transmit and receive wireless signals over antenna 512. Antenna 512 may be, for example, an ultra high frequency (UHF) antenna.

As depicted, sensor unit 504 is connected to capacitive probe connector 510. Sensor unit 504 is configured to obtain information from sensors connected to capacitive probe connector 510. Additionally, controller 506 may store information in storage 508 prior to antenna 512 transmitting the information. Sensor unit 504 also may perform some processing and calculations with controller 506 based on information received from sensors connected to capacitive probe connector 510.

For example, electrical signals received by capacitive probe connector 510 may be processed to identify a fuel level from the capacitance detected at capacitive probe connector 510. As another example, these electrical signals also may be processed to determine whether moisture is present.

In other illustrative examples, the electrical signals received by capacitive probe connector 510 may be converted into numerical values. These numerical values may be stored in storage 508 for transmission by antenna 512.

Storage 508 is configured to function as a storage device for information that may be received from sensors connected to capacitive probe connector 510. Information may be stored in storage 508 until the information is transmitted by antenna 512.

Capacitive probe connector 510 is configured to be connected to a capacitive probe. This connector is configured to send a current to the capacitive probe. Capacitive probe connector 510 may be connected to another type of sensor in addition to a capacitive probe in some illustrative examples.

Power source 502 is connected to sensor unit 504. Power source 502 is configured to generate power for the different components in wireless unit 500 from radio frequency signals. These radio frequency signals may be the same radio frequency signals including requests for information from wireless unit 500.

When power is generated by power source 502 in response to radio frequency signals, the power may cause sensor unit 504 to read information from capacitive probe connector 510 and transmit the information over antenna 512. Thus, the radio frequency waves may be used to initiate the collection and transmission of information by fuel sensor units over wireless communications links.

The illustration of wireless unit 500 is not meant to imply limitations in the manner in which wireless unit 404 in FIG. 4 may be implemented. For example, other wireless units may include additional connectors for sensors. In yet other illustrative examples, other connectors for other sensors may be included in addition to capacitive probe connector 510.

Turning now to FIG. 6, an illustration of a sensor unit is depicted in accordance with an illustrative embodiment. In this illustrative example, fuel sensor unit 600 is an example of a physical implementation of fuel sensor unit 400 shown in block form in FIG. 4.

As depicted, fuel sensor unit 600 includes a number of different components. Fuel sensor unit 600 includes structure 602, capacitive sensor 604, and wireless unit 606.

In this illustrative example, structure 602 has a number of different functions. For example, wireless unit 606 is associated with structure 602. In particular, wireless unit 606 is shown in phantom as being located within interior 608 of structure 602.

In one illustrative example, structure 602 may function as a protective housing for wireless unit 606. In some illustrative examples, structure 602 may be sealed to reduce or prevent the entry of fluids such as fuel into the interior of structure 602. Additionally, structure 602 may be configured to be attached to a wall or other structure in a fuel tank.

Structure 602 may be comprised of a number of different materials. For example, structure 602 may be comprised of a plastic, a metal, polycarbonate, or some other suitable type of material. Further, structure 602 may be encased in a coating. This coating may be comprised of epoxy and/or other types of material that are configured to allow signals to be transmitted through the coating. With the use of an epoxy as a coating with structure 602, undesired electrical discharges may be reduced or prevented within the fuel tank.

When wireless unit 606 is located inside of structure 602, the material may be selected as one that allows for the transmission of wireless signals through structure 602. In these illustrative examples, the wireless signals are radio frequency signals.

Capacitive sensor 604 is comprised of first tube 610 and second tube 612. In this illustrative example, first tube 610 is located within second tube 612. Portions of first tube 610 within second tube 612 are shown in phantom in this depicted example.

In particular, first tube 610 may be located concentrically within second tube 612. In other words, the center of first tube 610 and the center of second tube 612 may be positioned around axis 614 extending through first tube 610 and second tube 612.

Wireless unit 606 is configured to detect the capacitance between first tube 610 and second tube 612 in capacitive sensor 604 when a fluid contacts both first tube 610 and second tube 612. Wireless unit 606 may transmit information about the fuel level in a fuel tank based on the capacitance detected. In these illustrative examples, wireless unit 606 may transmit the information in the form of the capacitance detected, a fuel level calculated based on the capacitance detected, or both depending on the particular implementation.

Turning now to FIG. 7, an illustration of a sensor unit in a fuel tank is depicted in accordance with an illustrative embodiment. In this illustrative example, fuel sensor unit 600 is shown as being associated with wall 700 of fuel tank 702. Fuel tank 702 is an example of a physical implementation of a fuel tank in number of fuel tanks 206 shown in block form in FIG. 2. In this illustrative example, fuel sensor unit 600 is located in interior 704 of fuel tank 702. As can be seen, capacitive sensor 604 is partially immersed in fuel 706 in fuel tank 702.

As the level of fuel 706 increases or decreases within fuel tank 702, the capacitance between first tube 610 and second tube 612 in capacitive sensor 604 increases or decreases. In these illustrative examples, the capacitance is based on a dielectric for air where fuel is absent between first tube 610 and second tube 612 and a dielectric for fuel where fuel is present between first tube 610 and second tube 612. As fuel level increases or decreases, the proportion of the two dielectrics changes. This change in the proportion of the air dielectric and the fuel dielectric relative to each other changes the capacitance between first tube 610 and second tube 612. The capacitance for different levels of fuel may be stored in wireless unit 606. These values may be used to identify a fuel level from the capacitance detected in capacitive sensor 604 by wireless unit 606.

Additionally, capacitive sensor 604 may also be used to detect moisture in fuel tank 702. In these illustrative examples, an open state is present between first tube 610 and second tube 612 when moisture is absent. In other words, capacitance may be detected, but a flow of current is not present. If moisture is present, then current may propagate between first tube 610 and second tube 612. The detection of this current indicates that a closed state is present between first tube 610 and second tube 612. This closed state indicates a presence of moisture.

In this manner, capacitive sensor 604 may function to generate information about fuel level, moisture, or both within fuel tank 702. As a result, this sensor may provide dual functionality in fuel sensor unit 600.

The illustration of fuel sensor unit 600 in FIG. 6 and FIG. 7 is not meant to imply limitations to the manner in which other sensor units may be implemented. For example, capacitive sensor 604 may be comprised of two parallel plates instead of two concentric tubes.

In yet other illustrative examples, additional sensors may be connected to wireless unit 606 in addition to capacitive sensor 604. For example, a pressure transducer that determines fuel height based on an amount of pressure at the bottom of the fuel tank may be connected to wireless unit 606 in addition to capacitive sensor 604. Further, an ultrasonic probe may be used in addition to capacitive sensor 604. In this example, the ultrasonic probe may send sound waves into the fuel tank and measure the time for the sound waves to penetrate the fuel and return to the ultrasonic probe. As the amount of fuel in the fuel tank changes, the time for the sound waves to reach the ultrasonic probe also changes. Of course, other sensors may be used in addition to capacitive sensor 604, depending on the particular implementation.

Figure 8:
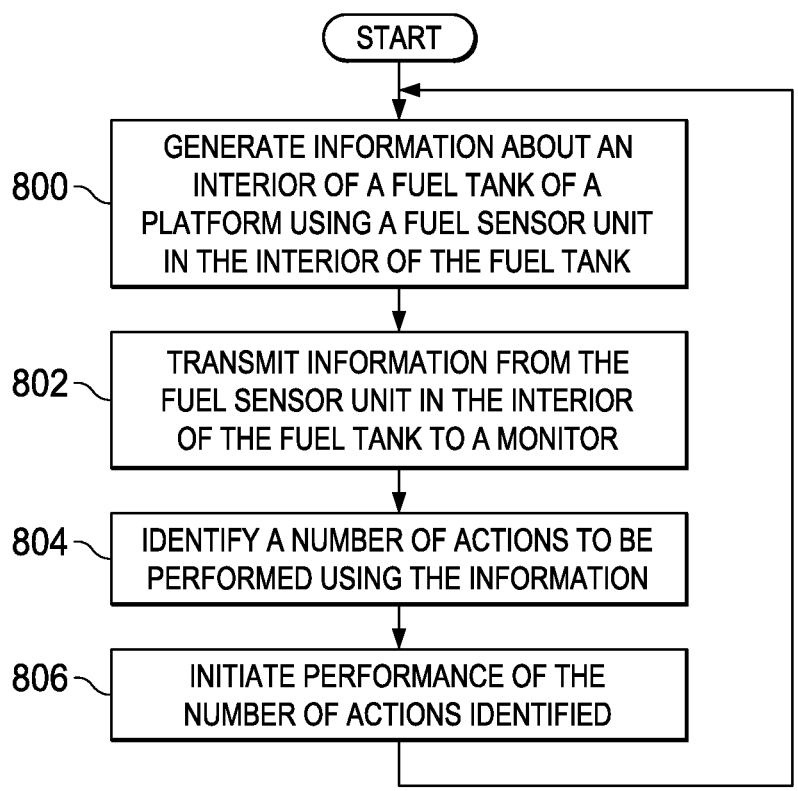
FIG. 8 is an illustration of a flowchart of a process for monitoring a fuel tank system in accordance with an illustrative embodiment.

Turning now to FIG. 8, an illustration of a flowchart of a process for monitoring a fuel tank system is depicted in accordance with an illustrative embodiment. The process illustrated in FIG. 8 may be generated using fuel tank monitoring system 200 in FIG. 2.

The process begins by generating information about an interior of a fuel tank of a platform using a fuel sensor unit in the interior of the fuel tank (operation 800). The fuel sensor unit comprises a sensor and a wireless unit. The sensor is configured to be located in the interior of the fuel tank and generate information about a level of fuel in the fuel tank and moisture in the fuel tank. The wireless unit is electrically connected to the sensor. Further, the wireless unit is configured to receive the information from the sensor and transmit the information using wireless signals.

The process then transmits information from the fuel sensor unit in the interior of the fuel tank to a monitor (operation 802). The monitor identifies a number of actions to be performed using the information (operation 804). The number of actions may take various forms. For example, the number of actions may be to display information, store information, generate an alert, initiate a maintenance request, calculate a range of travel for the platform, and other suitable actions.

In these illustrative examples, the display of information may include displaying the information on a display device on a computer system in the platform. As another example, generating an alert may comprise generating an alert by the computer system when the information indicates that moisture is present in the interior of the fuel tank.

The process then initiates performance of the number of actions identified (operation 806). The process then returns to operation 800.

Figure 9:
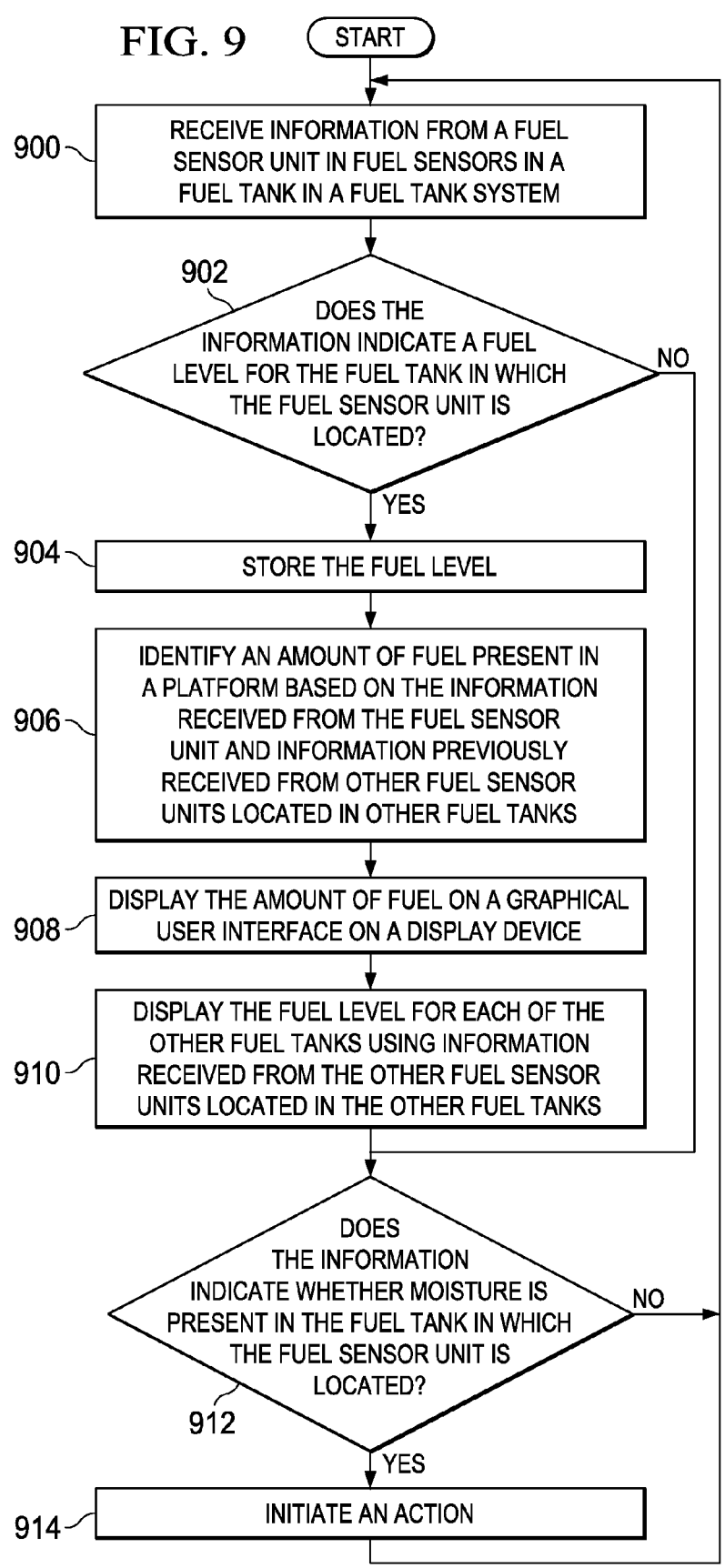
FIG. 9 is an illustration of a flowchart of a process for monitoring a fuel tank system in accordance with an illustrative embodiment.

Turning now to FIG. 9, an illustration of a flowchart of a process for monitoring a fuel tank system is depicted in accordance with an illustrative embodiment. The process in FIG. 9 may be implemented in platform 202 to monitor fuel tank system 204 using fuel tank monitoring system 200 in FIG. 2.

The process begins by receiving information from a fuel sensor unit in fuel sensor units in a fuel tank in a fuel tank system (operation 900). In operation 900, information may be received from different fuel sensor units in the fuel sensor units in the fuel tank monitoring system at different times or at substantially the same time. Next, a determination is made as to whether the information indicates a fuel level for the fuel tank in which the fuel sensor unit is located (operation 902).

If the information indicates the fuel level, the process stores the fuel level (operation 904). This fuel level is stored in association with an identification of the sensor sending the information. Next, the process identifies an amount of fuel present in a platform based on the information received from the fuel sensor unit and information previously received from other fuel sensor units located in other fuel tanks (operation 906). The process then displays the amount of fuel on a graphical user interface on a display device (operation 908). The process also displays the fuel level for each of the other fuel tanks using information received from the other fuel sensor units located in the other fuel tanks (operation 910). The process then returns to operation 900.

With reference again to operation 902, if the information does not indicate the fuel level, a determination is made as to whether the information indicates whether moisture is present in the fuel tank in which the fuel sensor unit is located (operation 912). If the information indicates that moisture is present, the process initiates an action (operation 914) with the process returning to operation 900. This action may be, for example, the generation of an alert. This alert may be displayed on a graphical user interface on a display device. In other illustrative examples, the action may be an audible alert. In still other examples, the action may generate a maintenance request or other suitable actions. If the information does not indicate a presence of moisture, the process also returns to operation 900.

In this manner, the different operations in FIG. 9 may be used to monitor the fuel level and determine whether moisture is present in different fuel tanks or in different locations in a fuel tank. The different operations may be performed using multiple fuel sensor units that may be placed in different locations within the number of fuel tanks in the fuel tank system.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, additional operations may be included in FIG. 9 to monitor for and process other information in addition to fuel level and moisture. For example, operations may be included to monitor for information temperature, amount of inert gases, and other types of conditions about a fuel tank.

Figure 10:
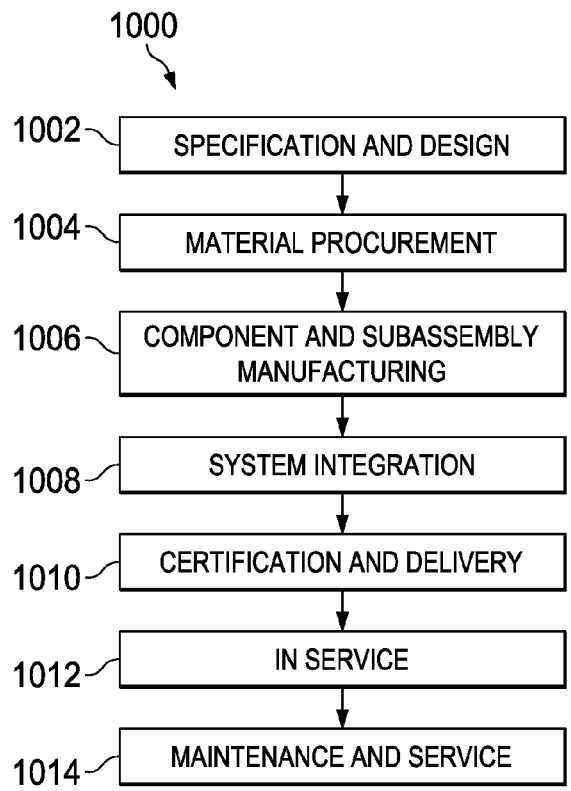
FIG. 10 is an illustration of an aircraft manufacturing and service method in accordance with an illustrative embodiment.
Figure 11:
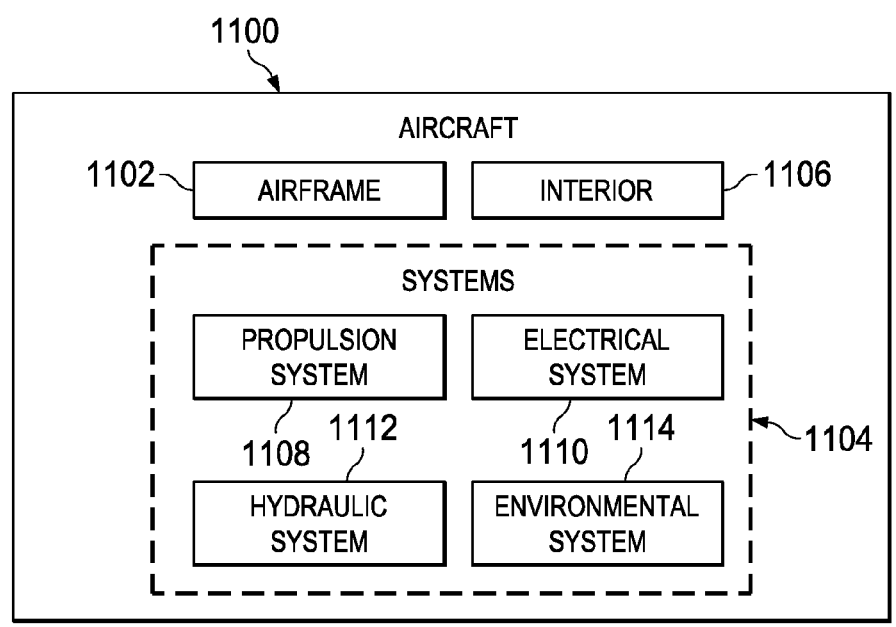
FIG. 11 is an illustration of an aircraft in which an illustrative embodiment may be implemented.

Illustrative embodiments of the disclosure may be described in the context of aircraft manufacturing and service method 1000 as shown in FIG. 10 and aircraft 1100 as shown in FIG. 11. Fuel tank monitoring system 200 may be installed in aircraft 1100 during aircraft manufacturing and service method 1000.

Turning first to FIG. 10, an illustration of an aircraft manufacturing and service method is depicted in accordance with an illustrative embodiment. During pre-production, aircraft manufacturing and service method 1000 may include specification and design 1002 of aircraft 1100 in FIG. 11 and material procurement 1004.

During production, component and subassembly manufacturing 1006 and system integration 1008 of aircraft 1100 in FIG. 11 takes place. Thereafter, aircraft 1100 in FIG. 11 may go through certification and delivery 1010 in order to be placed in service 1012. While in service 1012 by a customer, aircraft 1100 in FIG. 11 is scheduled for routine maintenance and service 1014, which may include modification, reconfiguration, refurbishment, and other maintenance or service.

Each of the processes of aircraft manufacturing and service method 1000 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 11, an illustration of an aircraft is depicted in which an illustrative embodiment may be implemented. In this example, aircraft 1100 is produced by aircraft manufacturing and service method 1000 in FIG. 10 and may include airframe 1102 with plurality of systems 1104 and interior 1106. Examples of systems 1104 include one or more of propulsion system 1108, electrical system 1110, hydraulic system 1112, and environmental system 1114. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1000 in FIG. 10.

One or more illustrative embodiments may be implemented during system integration 1008 during the manufacturing of aircraft 1100. Further, an illustrative embodiment may be implemented during maintenance and service 1014. For example, fuel tank monitoring system 200 may be installed on aircraft 1100 during routine maintenance, upgrades, refurbishment, and other operations that may be occurring during maintenance and service 1014. Further, the different illustrative embodiments may be implemented to monitor a fuel tank system in aircraft 1100 while aircraft 1100 is in service 1012. The use of a number of the different illustrative embodiments may substantially expedite the assembly of and/or reduce the cost of aircraft 1100.

One or more of the different illustrative embodiments may be implemented to monitor fuel tanks in a platform. In these illustrative examples, the illustrative embodiments may reduce wires that may be needed to generate information about a fuel tank. In these illustrative examples, a wireless unit electrically connected to one or more sensors may be placed inside of the fuel tank. The wireless unit transmits information generated by the sensor to a device located outside of the fuel tank. Thus, the illustrative embodiments may reduce the amount of time and effort needed to manufacture a platform such as an aircraft. Additionally, one or more illustrative embodiments also may reduce the amount of maintenance needed by reducing the number of holes and seals that are formed in a fuel tank.

As another illustrative example, with a fuel tank monitoring system in accordance with an illustrative embodiment, the moisture detection may supplement or replace fuel quantity indicating systems that may be currently used to identify the fuel level in a fuel tank of an aircraft. Currently, if too much water is present in the fuel tank, an erroneous reading is generated by these systems. A fuel tank monitoring system such as fuel tank monitoring system 200 in FIG. 2 may be used to determine whether moisture is actually present or that some other issues may be present that causes the erroneous reading in the fuel quantity indicating system. Further, the fuel tank monitoring system may be used to test fuel tanks.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a sensor configured to be located in an interior of a fuel tank and generate information about a fuel level in the interior of the fuel tank and about moisture in the fuel tank, the sensor being a single capacitive probe comprising a first tube and a second tube, wherein the first tube is located inside of the second tube, the first tube configured to conduct an electrical signal that determines whether the moisture is present in the fuel tank based upon whether the second tube receives the electrical signal; and
   a wireless unit electrically connected to the sensor, wherein the wireless unit is configured to receive the information from the sensor and transmit the information using wireless signals.

2. The apparatus of claim 1 further comprising:
   a power source configured to provide power to the sensor and the wireless unit, wherein the power source is selected from at least one of an energy harvesting device and a battery system.

3. The apparatus of claim 1, wherein the sensor and the wireless unit form a fuel sensor unit and further comprises:
   a monitor configured to receive the information from the fuel sensor unit.

4. The apparatus of claim 1 further comprising:
   a computer system in communication with the wireless unit, wherein the computer system is configured to receive the information, store the information, and display the information on a graphical user interface.

5. The apparatus of claim 1, comprising:
   a second sensor electrically connected to the wireless unit.

6. The apparatus of claim 5, wherein the second sensor is selected from one of a temperature sensor.

7. The apparatus of claim 1, wherein the single capacitive probe comprises:
   a first plate; and
   a second plate, wherein the first plate is substantially parallel to the second plate.

8. The apparatus of claim 1, wherein the wireless unit comprises:
   an antenna;
   a circuit connected to the antenna; and
   a power source connected to the circuit.

9. The apparatus of claim 1, wherein the wireless unit is a radio frequency identification tag.

10. The apparatus of claim 1, wherein the fuel tank is located in a platform selected from one of a mobile platform, a stationary platform, a land-based structure, an aquatic-based structure, a space-based structure, a surface ship, a tank, a personnel carrier, a train, a spacecraft, a space station, a satellite, a submarine, an automobile, a power plant, a bridge, a dam, a house, a manufacturing facility, and a building.

11. A fuel tank monitoring system comprising:
   a number of fuel sensor units configured to be located in an interior of a fuel tank, wherein each fuel sensor unit in the number of fuel sensor units comprises a sensor configured to generate information about a fuel level in the fuel tank and moisture in the fuel tank, the sensor being a single capacitive probe comprising a first tube and a second tube, wherein the first tube is located inside of the second tube, the firs tube configured to conduct an electrical signal that determines whether the moisture is present in the fuel tank based upon whether the second tube receives the electrical signal;
   a wireless unit electrically connected to the sensor, wherein the wireless unit is configured to receive the information from the sensor and transmit the information using wireless signals; and
   a computer system configured to receive the information from the number of fuel sensor units and display the information on a graphical user interface.

12. The fuel tank monitoring system of claim 11, wherein the computer system is configured to sample the information generated by the number of fuel sensor units over the wireless signals.

13. The fuel tank monitoring system of claim 11 further comprising:
   a monitor configured to receive the information and display the information from the number of fuel sensor units on the graphical user interface.

14. The fuel tank monitoring system of claim 11, wherein the computer system is configured to initiate an action when a presence of the moisture is detected in the fuel tank.

15. A method for monitoring an interior of a fuel tank, the method comprising:

generating information about a fuel level and moisture in the interior of the fuel tank of a platform using a fuel sensor unit in the interior of the fuel tank, wherein the fuel sensor unit comprises a sensor configured to be located in the interior of the fuel tank and generate information about the fuel level in the fuel tank and the moisture in the fuel tank and a wireless unit electrically connected to the sensor, the sensor being a single capacitive probe comprising a first tube and a second tube, wherein the first tube is located inside of the second tube, the first tube configured to conduct an electrical signal that determines whether the moisture is present in the fuel tank based upon whether the second tube receives the electrical signal, wherein the wireless unit is configured to receive the information from the sensor and transmit the information using wireless signals; and identifying a number of actions based on the information about the interior of the fuel tank.

16. The method of claim 15, wherein the number of actions is selected from at least one of displaying the information on a display device in a computer system in the platform and generating an alert, by the computer system, when the information indicates that the moisture is present in the interior of the fuel tank.

17. The method of claim 15, wherein the fuel sensor unit further comprises a second sensor electrically connected to the wireless unit and is a temperature sensor.

* * * * *